US012621524B2

(12) United States Patent
Marchand et al.

(10) Patent No.: US 12,621,524 B2
(45) Date of Patent: May 5, 2026

(54) MANAGEMENT OF STANDBY OF A MULTIMEDIA STREAM READER TERMINAL

(71) Applicant: ORANGE, Issy-les-Moulineaux (FR)

(72) Inventors: Hervé Marchand, Châtillon Cedex (FR); Mathieu Rivoalen, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 160 days.

(21) Appl. No.: 18/542,909

(22) Filed: Dec. 18, 2023

(65) Prior Publication Data

US 2024/0205501 A1    Jun. 20, 2024

(30) Foreign Application Priority Data

Dec. 19, 2022    (FR) ...................................... 2213829

(51) Int. Cl.
H04N 21/443        (2011.01)

(52) U.S. Cl.
CPC .............................. H04N 21/4436 (2013.01)

(58) Field of Classification Search
CPC ......... H04N 21/43635; H04N 21/4367; H04N 21/4436
See application file for complete search history.

(56) References Cited

U.S. PATENT DOCUMENTS

| 7,386,641 B2 * | 6/2008 | Xu ...................... | H04L 61/5046 |
| | | | 725/98 |
| 10,341,598 B1 | 7/2019 | Senapati | |

| 10,964,203 B1 | 3/2021 | Fiaux et al. | |
| 2012/0226502 A1 * | 9/2012 | Ouchi .................. | H04N 21/439 |
| | | | 704/E21.001 |
| 2013/0129323 A1 * | 5/2013 | Bedingfield, Sr. .......................... | |
| | | | H04N 21/4312 |
| | | | 386/343 |
| 2015/0163558 A1 * | 6/2015 | Wheatley ......... | H04N 21/25891 |
| | | | 725/12 |
| 2016/0135047 A1 * | 5/2016 | Park ...................... | H04W 12/06 |
| | | | 455/411 |
| 2016/0198222 A1 * | 7/2016 | Friedman ........... | H04N 21/6405 |
| | | | 725/95 |
| 2016/0203343 A1 * | 7/2016 | Soffer ................. | G06F 13/4068 |
| | | | 726/34 |
| 2017/0163926 A1 * | 6/2017 | Fang ........................ | H04N 5/63 |
| 2017/0329386 A1 * | 11/2017 | Winemiller ............. | G06F 1/324 |
| 2021/0194945 A1 * | 6/2021 | Marchand .......... | H04N 21/2743 |

(Continued)

OTHER PUBLICATIONS

French Search Report and Written Opinion dated Jun. 7, 2023 for corresponding French Application No. 2213829, filed Dec. 19, 2022.

(Continued)

*Primary Examiner* — Michael B. Pierorazio
(74) *Attorney, Agent, or Firm* — David D. Brush; Westman, Champlin & Koehler, P.A.

(57)        ABSTRACT

A method for managing standby of a multimedia stream reader terminal, which is associated with a multimedia content restitution terminal via a communication link. The multimedia stream reader terminal detects a state of a link between the multimedia stream reader terminal and the restitution terminal on the communication link and goes into standby mode in the event of detection of an inactive state of the link.

7 Claims, 3 Drawing Sheets

(56)                References Cited

U.S. PATENT DOCUMENTS

| | | | |
|---|---|---|---|
| 2021/0400326 A1* | 12/2021 | Marchand | H04N 21/4384 |
| 2022/0321632 A1* | 10/2022 | Marchand | H04N 21/485 |
| 2022/0368755 A1* | 11/2022 | Rivoalen | H04L 47/30 |
| 2022/0377396 A1* | 11/2022 | Rivoalen | H04N 21/4384 |
| 2024/0276039 A1* | 8/2024 | Rivoalen | H04N 21/25825 |

OTHER PUBLICATIONS

Jinsoo Han et al., "Service-oriented power management for an integrated multi-function home server", IEEE Transactions On Consumer Electronics, IEEE Service Center, New York, NY, US, vol. 53, No. 1, Feb. 1, 2007 (Feb. 1, 2007), pp. 204-208, XP011175944.
European Communication under Article 94(3) EPC dated Jul. 21, 2025 for corresponding European Application No. 23 216 519.1.
Anonymous, "Ignite TV set-top boxes now support HDMI-CEC—Rogers Community," Oct. 18, 2020 (Oct. 18, 2020), pp. 1-11, XP093293644.

* cited by examiner

MANAGEMENT OF STANDBY OF A MULTIMEDIA STREAM READER TERMINAL

CROSS-REFERENCE TO RELATED APPLICATIONS

This application claims priority to and the benefit of French Patent Application No. FR 2213829, filed Dec. 19, 2022, the content of which is incorporated herein by reference in its entirety.

FIELD OF THE DISCLOSURE

The field of the disclosure is that of digital multimedia content, namely digital audio and/or video content, in particular, but not exclusively, in the context of the routing of digital content within a local area communication network, such as a home network. More specifically, the disclosure relates to the optimization of network resources and energy resources of a communication operator and a client of a local area communication network, by improved management of the automatic standby of a multimedia stream reader terminal.

PRIOR ART AND ITS DISADVANTAGES

Access to multimedia content, such as television or video on demand, from an Internet type network, is possible today, for most restitution terminals, particularly when they belong to a local area communication network, such as a home network.

The terminal generally emits a request to a server, indicating the chosen content and it receives in return a stream of digital data relating to this content. In the context of a local area communication network, such a request passes through the network access gateway, for example the residential gateway.

The terminal is adapted to receive this digital content in the form of multimedia data and to restitute it. This restitution consists of providing the digital content at the terminal in a form accessible to the user. For example, received data corresponding to a video is generally decoded, then restituted at the terminal in the form of a display of the corresponding video with its associated soundtrack. In the following, for the sake of simplification, the digital content will be assimilated to a video and the restitution by the terminal, or consumption by the user of the terminal, will be assimilated to a visualization on the screen of the terminal.

The broadcast of digital content on the Internet is often based on client-server protocols from the HTTP ("Hyper Text Transport Protocol") family. In particular, progressive mode downloading of digital content, also called streaming, allows to transport and consume data in real time, that is to say that the digital data are transmitted over the network and restituted by the terminal as they arrive.

For example, among the known techniques, adaptive progressive downloading, or HTTP Adaptive Streaming, abbreviated HAS, allows to broadcast and receive data in different qualities corresponding for example to different bit rates.

There are several technical solutions to facilitate the distribution of such streaming content, such as the proprietary Microsoft® (registered trademark) Smooth Streaming, Apple® HLS, Adobe® HTTP Dynamic Streaming solutions or else the MPEG-DASH standard of the ISO/IEC organization.

The consumption of digital content in adaptive progressive downloading (HAS) tends to become more widespread. It is used in particular by many streaming services, but also by certain TV decoders, or set-top-box, which use it to access delinearized content, such as video on demand (VOD), delayed broadcast of television programs (Replay), or else Network PVR (for "Network Personal Video Recorder" type offers, that is to say a digital content recording service, carried out by the content provider itself rather than at the end user's home).

Furthermore, other devices such as real-time multimedia stream reader apparatuses also access digital content in adaptive progressive download mode for real-time (or Live) television content. This is the case, for example, of the Chromecast® apparatus developed by Google®, or the CléTV® from Orange®. Such apparatuses, more generically referred to as HDMI keys, can also be used to access video-on-demand content.

Such apparatuses are conventionally plugged into the HDMI port of a television and communicate, via Wi-Fi connection, with another apparatus of the home communication network connected to a wide area communication network such as the Internet (residential gateway, computer, a smartphone, tablet, . . . ), in order to reproduce, on the television, the multimedia content received by a compatible software application. Subsequently these apparatuses will be referred to under the generic designation of HDMI key.

Such apparatuses can also be used to access video-on-demand content, or to restitute personal content stored in the home network on the television, such as a video of the last vacation or the last family event.

Thus, generally speaking, in a domestic environment, a multimedia stream reader terminal (for example a set-top box or an HDMI key) downloads multimedia content from a content distribution platform available on the wide area Internet network, and transmits it for restitution to a content restitution terminal (for example a television or a PC), to which it is generally connected by an audio/video interface connection conforming to the HDMI (for "High-Definition Multimedia Interface") standard.

In addition, nowadays, most multimedia content is protected by copyright, which then requires the implementation of protection techniques for their broadcast or transmission between terminals. An example of such a protection technique, the implementation of which is increasingly required by the rights holders of this content, is the HDCP (for "High-Bandwidth Digital Content Protection") method, intended to control high-definition digital video and audio streams. It mainly uses DVI, HDMI or DisplayPort interfaces and connections, and allows to restrict the use of protected streams, in particular to prohibit direct digital video or audio copying.

For example, it is possible to mount an HDCP session at the HDMI channel which connects a television and a multimedia stream reader terminal, such as an HDMI key or a television decoder. Such a multimedia content protection session thus allows to prevent the copying of multimedia streams transmitted by the HDMI channel on which the HDCP session is mounted, and involves the encryption of these multimedia streams as well as the exchange of security keys for their decryption. This technique for protecting multimedia content protected by copyright is known per se, and will therefore not be described here in more detail.

The problem of energy consumption of the various equipment in a domestic network is the subject of an increasingly acute awareness on the part of consumers, who are concerned about reducing their electricity consumption, for the purpose of personal savings on the one hand, and preservation of the environment on the other hand.

However, to date, there are three main modes of placing multimedia stream reader terminals on standby:

upon explicit request from the user, for example by pressing a standby button on the terminal or a monitoring device remote control associated therewith;

upon detection of prolonged inactivity of the user, to compensate for a possible forgetting of explicit standby by the user. For example, the manufacturer of the multimedia stream reader terminal can provide automatic standby for the terminal if, during a period of inactivity whose duration is generally set at approximately four hours, the user has not interacted with the terminal, nor pressed any button on the remote control which controls it;

by use of the HDMI CEC ("Consumer Electronics Control") standard, which allows the exchange of commands between compatible equipment, and in particular the automatic standby of the multimedia stream reader terminal when the user turns off the restitution terminal connected thereto. This mode, however, requires explicitly activating the option, both on the restitution terminal side and on the multimedia stream reader terminal side.

On the fleet of TV decoders managed by the operator Orange®, it is seen that a very large number of users turn off their television but never their set-top box. Thus, after viewing content (Live, Replay, Video on demand, . . . ), the user turns off their television by explicit command via the dedicated remote control and the set-top box then goes into standby mode, for example after four hours, by detection of non-activity.

Thus, the analysis of statistical data available to the operator shows that, in 30% of cases, multimedia stream reader terminals are active and consume video content, even when the television is turned off.

Indeed, most often, the power supply to terminals such as HDMI keys is provided by a micro-USB (for "Universal Serial Bus") port, located for example at the back of the HDMI key, which plugs into a corresponding USB port on the TV or an external power source. In the latter case, the operation of such apparatuses is therefore uninterrupted, to the extent that they are generally not equipped with on/off switches. Indeed, the user will naturally turn off or place his television on standby but will not unplug his HDMI key from the mains so that, when the television is turned on again, he can access the content without delay related to restarting the HDMI key. This user habit of not unplugging their HDMI key also applies to the TV decoder, rarely unplugged when the user's TV is turned off, and in general for any equipment connected via an HDMI channel to a TV.

However, digital content called "live" digital content, that is to say which corresponds to television programs in real time, does not, by nature, have a predefined duration or end date. As a result, if the end user does not explicitly stop the broadcast of this content, for example by explicitly stopping the broadcast of the content on the HDMI key or the decoder (for example by returning to the home page) or by interrupting its power supply, they can be played indefinitely by the HDMI key or decoder, which receives them from a connected apparatus of the home network, and provides them to the television so that it can restitute them, even if the latter is turned off and therefore does not display any content on its screen. This therefore results in permanent and unnecessary consumption of bandwidth resources, both within the local area communication network and the wide area communication network of the Internet service provider, as well as unnecessary power consumption.

This can be problematic from several points of view.

First of all, the end user is generally unaware of this problem. Indeed, most often, when he stops watching the television program, he turns off or places his television on standby, which leads him to think that he has thus effectively stopped the broadcast of the content he was viewing. He is generally unaware that the HDMI key or decoder continues to acquire digital content in progressive adaptive download mode. He may therefore be surprised that the bit rate or bandwidth in the home network is low, for the other uses he wishes to make of it, which is a source of dissatisfaction.

Furthermore, unlike multicast type content (for example for conventional IP television), content broadcast in adaptive progressive download HAS mode consumes much more network resources for the operator of the wide area communication network. Indeed, the stream is not duplicated as close as possible to the customer, but multiplied by the number of customers who consume it. When a multitude of customers use, for example, such an HDMI key, which they leave running continuously without necessity, this unnecessary consumption of network resources can take on problematic proportions for the operator.

For these two reasons, it is important, for the provider of access to the wide area communication network, to ensure that the broadcast digital content is broadcast for good purpose, and in particular stops consuming unnecessary network and bandwidth resources, when the end user no longer wishes to view them, for example if he is no longer in front of his television.

To resolve this problem, it is considered to implement the standby method mentioned above: upon detection that a user has not interacted with their HDMI key or decoder for a certain time (for example four hours), a pop-up window is displayed on the television screen for a predetermined duration (for example sixty seconds). The message displayed in this window invites the user to confirm their presence in front of the screen, for example by pressing a button on the television remote control. If the user responds to this invitation, the broadcast of the content via the HDMI key or decoder continues. Otherwise, at the end of the predetermined duration of display of the pop-up window, the stream associated with the live digital content is suddenly cut off, and the HDMI key or decoder is on standby, in order to free up network resources.

This interesting solution, however, turns out to be radical and quite brutal. Furthermore, the consumption of network resources continues long after the user has lost interest in the broadcast content, which is not optimal. It is possible to consider reducing the duration of content broadcast before displaying the pop-up window, for example to two hours, but to the possible detriment of user dissatisfaction, who could be bothered by the untimely display of this window, in the middle of his television program.

There is therefore a need for a technique for automatically placing a multimedia stream reader terminal on standby, which does not have these various disadvantages of the prior art. In particular, there is a need for such a technique which allows better optimization of the consumption of network and energy resources, and therefore a reduction in the duration preceding the activation of the standby mode of the terminal.

SUMMARY

An exemplary aspect of the present disclosure relates to a method for managing standby of a multimedia stream reader terminal, associated with a multimedia content restitution terminal via a communication link, comprising steps of detecting a state of a link between the multimedia stream reader terminal and the restitution terminal on the communication link, and placing the multimedia stream reader terminal on standby in the event of detection of an inactive state of the link.

Thus, an aspect of the disclosure is based on a completely new and inventive approach of managing standby of a multimedia stream reader terminal, for example of the HDMI key or TV decoder type. Indeed, the solutions of the prior art propose placing such terminals on standby after a relatively long period, generally several hours, for example four hours, during which no interaction of the user of the content with the restitution terminal, such as a television, or the multimedia stream reader terminal was detected. On the contrary, the solution of an aspect of the disclosure aims at detecting more quickly the need to place the multimedia stream reader terminal on standby, and therefore to cut off the downloading of the multimedia stream, by almost continuous detection of the state of the link connecting it to the restitution terminal. This has the effect of reducing the consumption of network and energy resources, both for the operator of the wide area network and for the customer of the local area communication network. Such a method thus has a positive impact on the environment. It is, moreover, simple to implement with current technological means.

Thus, while the techniques of the prior art were mainly based on an observation of the user's interactions with their equipment, the solution of an aspect of the disclosure is based on the scanning of the state of the link between the multimedia stream reader terminal and the restitution terminal, and on the rapid standby of the multimedia stream reader terminal after detection that this link is no longer active.

For example, according to one embodiment, the link is detected as being inactive if the link, for example a copper or fiber cable, connecting the multimedia stream reader terminal to the restitution terminal is unplugged.

According to a first aspect, the detection of a state of a link between the multimedia stream reader terminal and the restitution terminal comprises at least two successive interrogations of the state of the link by the multimedia stream reader terminal. An inactive state of the link is detected when the link is considered inactive in response to the at least two successive interrogations of the multimedia stream reader terminal.

Thus, the duration of activation of the standby of the multimedia stream reader terminal is greatly reduced with regard to the standby methods of the prior art, which propose to place the terminal into automatic standby after a period of time generally several hours. According to the method of an aspect of the disclosure, on the contrary, the interrogations of the state of the link connecting the multimedia stream reader terminal and the restitution terminal are spaced only a few minutes apart, which proves sufficient to analyze the state of the link between these two terminals, and thus deduce a possible need for standby if this state was detected as inactive.

This detection technique is also advantageously reliable, since it is based on at least two interrogations of the state of the link, or even more, which allows to ensure the actual state of this link, or at the very least reduce the error percentage relating to this detection.

According to another aspect, the link between the multimedia stream reader terminal and the restitution terminal is a multimedia content protection session negotiated between the two terminals.

Thus, when the multimedia content exchanged between these two terminals is protected by copyright, the transmission of this content from the multimedia stream reader terminal to the restitution terminal is secured by this protection session, which allows in particular to prohibit the direct digital video or audio copy of this content. This protection technique allows to satisfy the rights holders, thus who will not block access to their digital property for users, and on the contrary allow their sharing and broadcasting.

In this embodiment, the state of the link is detected as inactive if the HDCP session is no longer established between the restitution terminal and the multimedia stream reader terminal.

According to another aspect, the detection of the inactive state of the link is accompanied by a request for restitution of an alert message.

Thus, this alert message advantageously allows to provide additional security to the double interrogation of the state of the link which connects the multimedia stream reader terminal and the restitution terminal, to ensure that placing the multimedia stream reader terminal on standby takes place when the user actually no longer needs to view multimedia content on their television. For example, in the case where he is no longer present in front of his television, or if he interacts with his television in such a way that he no longer requires the content to be displayed on his screen.

This alert message can be in the form of a pop-up window, which is displayed on the television (or on the command terminal of the multimedia stream reader terminal, for example the user's tablet), and which informs that the terminal will go to sleep shortly. The user can then, by simply pressing a button on the remote control of the television or terminal, signal his presence, and thus return to the initial management mode of downloading and broadcasting multimedia content.

In the case where the restitution terminal was placed on standby by the user, the command to display the message is sent, but the message is not displayed on the screen of the restitution terminal, which is in a standby state.

According to yet another aspect, in the absence of a response to the alert message within a given time range, the multimedia stream reader terminal goes into standby mode.

Thus, the terminal is placed on standby in a reliable manner, since this given time range allows to ensure the effective absence of the user, or at the very least the uselessness of the transmission of the multimedia stream to the restitution terminal.

An aspect of the disclosure also relates to a device for managing standby of a multimedia stream reader terminal, associated with a multimedia content restitution terminal via a communication link. Such a device comprises a detection module for detecting a state of a link between the multimedia stream reader terminal and the restitution terminal on the communication link, and a standby module for placing the multimedia stream reader terminal on standby.

According to one aspect, the detection module comprises means for emitting commands to carry out at least two successive interrogations of the state of the link by the multimedia stream reader terminal. The standby module, in turn, comprises means for emitting standby commands for the multimedia stream reader terminal when, in response to the two successive minimum interrogations, the state of the link is detected as being inactive.

According to another aspect, this device further comprises a module for establishing a multimedia content protection session, comprising means for emitting commands for negotiating a multimedia content protection session between the multimedia stream reader terminal and the restitution terminal, when they are active.

An aspect of the disclosure also relates to a stream reader terminal, comprising a standby management device as presented above.

An aspect of the disclosure also relates to a computer program product capable of being implemented on a management device as described above, comprising program code instructions for implementing a method for managing standby of a multimedia stream reader terminal according to an aspect of the disclosure and as described above, when executed by a processor.

An aspect of the disclosure also relates to a data medium on which at least one series of program code instructions was stored for the execution of a method for managing standby of a multimedia stream reader terminal according to an aspect of the disclosure as described above.

Such a media can be any entity or device capable of storing the program. For example, the medium may include a storage means, such as a ROM, for example a CD ROM or a microelectronic circuit ROM, or else a magnetic recording means, for example a USB key or a hard disk.

On the other hand, such a medium may be a transmissible medium such as an electrical or optical signal, which may be conveyed via an electrical or optical cable, by radio or by other means, so that the computer program it contains can be executed remotely. The program according to an aspect of the disclosure can in particular be downloaded onto a network, for example the Internet network.

Alternatively, the support may be an integrated circuit wherein the program is incorporated, the circuit being adapted to execute or to be used in the execution of the aforementioned display control method.

The standby management device of a multimedia stream reader terminal, the multimedia stream reader terminal, the computer program and the corresponding data medium mentioned above have at least the same advantages as those conferred by the method for placing a multimedia stream reader terminal on standby according to the present disclosure.

BRIEF DESCRIPTION OF THE DRAWINGS

Other purposes, features and advantages will appear more clearly upon reading the following description, given by way of a simple illustrative and non-limiting example, in relation to the figures, among which.

DETAILED DESCRIPTION OF ILLUSTRATIVE EMBODIMENTS

The general principle of an aspect of the disclosure is based on the detection of the state of the link which connects a multimedia stream reader terminal to a multimedia content restitution terminal at a communication link, for example an HDMI link, in order to determine whether the multimedia stream reader terminal can be placed on standby. This detection thus allows to considerably reduce the duration of activation of the automatic standby of such a terminal, since the latter is effectively placed on standby as soon as it has been detected that the state of the link which connects it to the restitution terminal is inactive. This reduction in standby time allows to optimize the consumption of network and energy resources, both for the operator of the wide area communication network and for the local area communication network. Indeed, the method of an aspect of the disclosure allows to cut off the multimedia stream more quickly compared to the automatic standby modes of the prior art, which offer this standby after a much longer time, generally about four hours. These known methods therefore do not prevent the consumption of multimedia content from the moment the restitution terminal, such as a television, is turned off. This innovative standby method also has a positive impact on the environment.

Figure 1:
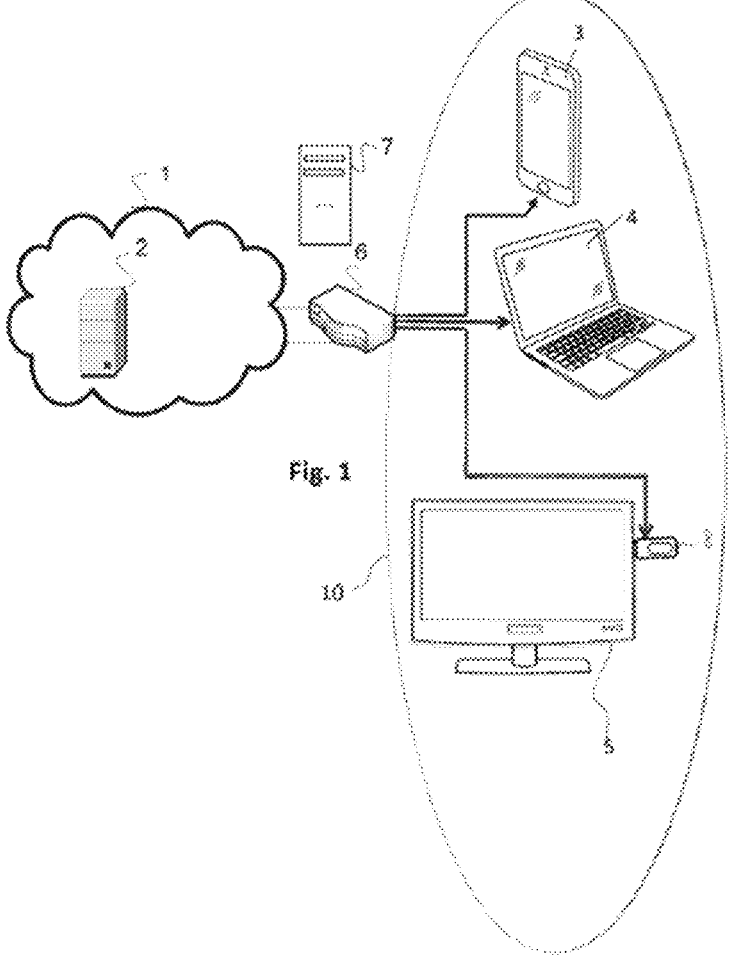
FIG. 1 shows an architecture of a domestic environment comprising, in a local area communication network, different terminals capable of accessing multimedia content by communication with a wide area network.

An architecture of a domestic environment comprising, in a local area communication network, different terminals capable of accessing multimedia content by communication with a wide area network, will now be presented in relation to FIG. 1.

The terminal 3, for example a smartphone, the terminal 4, for example a laptop computer, and the terminal 8, for example an HDMI key or a decoder (not shown) connected to a television 5, are located in this example located in a local area network (LAN, 10) controlled by a domestic gateway 6. The context of the local area network is given as an example and could be easily transposed to a "best effort" type Internet network, a business network, etc.

A digital content server 2 is located according to this example in the wide area network (WAN, 1) but it could equally be located in the local area network (LAN, 10), for example in the domestic gateway 6 or any other equipment capable of hosting such a content server. The content server 2 receives, for example, digital television content channels from a broadcast television network, not shown, and/or videos on demand, and makes them available to client terminals.

The client terminals 3, 4 and 8 can communicate with the content server 2 to receive one or more contents (films, documentaries, advertising sequences, etc.), possibly protected by copyright. In general, a terminal emits a request to a server, indicating the chosen content and it receives in return a stream of digital data relating to this content. In the context of a local area communication network, such a request passes through the network access gateway, for example the residential gateway. More generally, such a request passes through the access point 6 to the wide area network 1. The terminal is adapted to receive this digital content in the form of multimedia data and to restitute it. This restitution consists of providing the digital content at the terminal in a form accessible to the user. For example, received data corresponding to a video are generally decoded, then restituted at the terminal in the form of a display of the corresponding video with its associated soundtrack.

It is common, in this client-server context, to use, to exchange data between client terminals 3, 4 and 8 and the server 2, an adaptive progressive download technique, "adaptive streaming", abbreviated as HAS based on the HTTP protocol. This type of technique allows in particular to offer good quality content to the user by taking into account variations in bandwidth which may occur on the connection between the client terminal 3, 4 and 8 and the service gateway 6, or between the latter and the content server 2.

Other data exchange techniques may also be used.

The service gateway 6 is in this example a domestic gateway which ensures the routing of data between the wide area network 1 and the local area network 10, manages the digital content by ensuring in particular their reception from the network and their decoding using the decoders that are here assumed to be integrated into the gateway 6 or the client terminals 3, 4 and 8. Alternatively, the decoders can be located elsewhere in the wide 1 or local 10 area network, in particular at an STB (Set-Top-Box) type element (not shown) associated with a television.

It is assumed here that the HDMI key 8 or the TV decoder is connected to the television 5 by plugging to the HDMI port of the latter, and is used to restitute, on the screen of the television 5, content, which may be a television program broadcast live or delayed, or a video on demand, or any other multimedia content, and possibly protected by copyright. Subsequently, this content is referred to as content C1.

In this example, the HDMI key 8 or the decoder is connected via WiFi® directly to the residential gateway 6. Alternatively, these devices could also be connected via WiFi® to another portable device in the home network, for example to the laptop 4 or the smartphone 3, through which they could access the wide area communication network 1.

In the specific case of the HDMI 8 key, it can also be controlled by the user using the smartphone 3, on which a software application for commanding the HDMI key 8 is installed.

The fragments of content obtained by the residential gateway 6 are for example transmitted via WiFi® to the HDMI key 8 or to the TV decoder, which controls their display on the screen of the television 5, for restitution to the user. In the case where this content is protected by copyright, a multimedia content protection session, otherwise called HDCP session, can be negotiated between the HDMI key 8/the TV decoder and the television 5, and established at the HDMI link connecting these terminals. In such a case, this session is essential for the transmission of the multimedia data stream to take place between the HDMI key/TV decoder and the television, and for the television to display the corresponding content.

Figure 2:
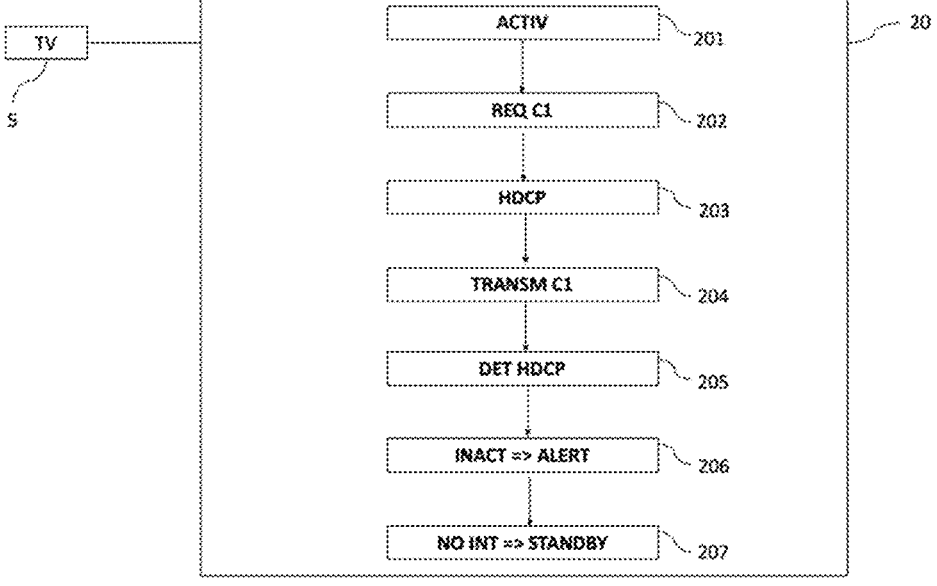
FIG. 2 schematically illustrates the method for managing standby of a multimedia stream reader terminal according to one aspect of the disclosure.

An example of optimized standby of a multimedia stream reader terminal 20, such as an HDMI key 8 or a TV decoder presented in FIG. 1, is now presented in relation to FIG. 2.

The multimedia stream reader terminal 20 is connected to a television set 5 via a communication link, for example an HDMI link, and in particular an HDMI cable.

In a first step referenced 201, the terminal 20 is activated, thanks to the interaction of a user with an interface module of the terminal, for example by pressing an initialization button of a remote control associated with the terminal, or by interacting with a command terminal, such as a smartphone or a tablet, controlling this terminal 20. The terminal 20 is generally activated at the same time as the switching on of the television 5, with the aim of viewing multimedia content on the screen of this TV.

It is therefore in a following step referenced 202 that, still through interaction of the user with the interface module of the terminal, this user makes a request with the aim of accessing content C1, in order to display it on the television screen 5. In this specific embodiment, this content C1 is protected by copyright. But an aspect of the disclosure can also be implemented for multimedia content not protected by such copyright.

Thus, to be able to transmit the protected content C1 to the television, the multimedia stream reader terminal 20 must negotiate a content protection session (for example an HDCP session) with the television, in a following step referenced 203. Such HDCP session is established at the HDMI channel which connects these two terminals, in cooperation with these two terminals.

In a following step referenced 204, the content C1 is transmitted from the terminal 20 to the television 5, and is displayed on the screen of the latter.

It will be noted that the steps referenced 201 to 204 describe the general context wherein an aspect of the disclosure is inscribed, in its different embodiments, but are not steps strictly speaking of the standby management method according to the disclosure, of which they precede the implementation.

As soon as the terminal 20 is active, it continuously implements a detection of the state of the HDCP session which connects it to the television 5 (step referenced 205). For this purpose, it performs successive interrogations of the state of this HDCP session, for example three successive interrogations. This number of successive interrogations can however be lower, for example two successive interrogations, or else higher, for example four or five successive interrogations. It is, in all cases, necessary to carry out at least two successive interrogations of the state of this HDCP session, in order to reliably ensure its actual state. These interrogations are spaced in this example by a first period of determined duration, worth a few minutes at most, for example two minutes, three minutes, four minutes or five minutes. This duration was determined in order to be able to detect more quickly the inactivity of the HDCP session established between the two terminals. This allows to be more responsive in cutting off the multimedia stream in order to preserve network resources and energy. This also allows to guarantee reliability with regard to the detection of inactivity, avoiding an unexpected standby of the terminal 20, which would be related to poor determination of the state of the HDCP session between the terminal and the television 5.

In the case where the content C1 is not protected by copyright, the establishment of this HDCP session is not necessary between the terminal 20 and the television 5. The detection of the state of the link between these two terminals is therefore related to the state of their direct link, for example the connection state of the HDMI cable connecting them. Thus, if this cable is unplugged, the terminal 20, at the end of the successive interrogations which it carries out continuously, will detect that the link which connects it to the television 5 is inactive.

In a following step referenced 206, when at the end of at least two successive interrogations implemented by the terminal 20, the latter detects that the state of the HDCP session which connects it to the television 5 corresponds to an inactive state, the terminal sends a command to its interface module, to control the display on the television screen of a pop-up window, wherein a message is displayed, intended for the user and informing him that the cutoff of the multimedia stream corresponding to C1 is imminent, and that without interaction/action on his part during a second period of determined duration, worth for example sixty seconds, the stream will be cut and the terminal 20 will go into standby.

If the user reacts, for example by pressing a button on the remote control of the television 5, or by action on the remote control or the smartphone 3 controlling the terminal 20, the interface module of the terminal receives the corresponding information, and the download of the multimedia content C1 continues to operate. C1 is therefore displayed on the television screen 5.

If, on the other hand, the user does not appear during the second period of fixed duration following the command to display the pop-up window on the screen of the television 5 (step referenced 207), the download of C1 is interrupted and the terminal 20 goes into standby mode. Unnecessary consumption of network and energy resources then stops.

It should also be noted that during the step referenced 205, when the terminal 20 detects that the state of the HDCP session which connects it to the television 5 corresponds to an active state, the download of C1 continues to be carried out, and the display of this content on the TV is not interrupted.

Thus, the standby time of the terminal 20 is reduced compared to known automatic standby methods, which implement the display of a pop-up window, and therefore the detection or not of a user interaction with the television 5 and/or the terminal 20, generally after a period of several hours of inactivity, for example four hours. On the contrary, the method of an aspect of the disclosure implements the interrogation of the state of the link connecting the two terminals in an almost continuous manner, the successive interrogations implemented by the terminal 20 being spaced only a few minutes apart. The broadcast of the multimedia stream is therefore cut off just a few minutes after it has been detected that the user was no longer interested in the broadcast of the content C1.

The display of a pop-up window also provides additional security in this standby method, because it allows the user to report in cases where the detection of the inactive state of the link between the terminal 20 and the television 5 would be based on an error in handling the television and/or the terminal on the part of the user, or in cases where the latter, inactive/absent for a certain time, would finally like to continue viewing the multimedia content. This standby method is therefore reliable. It also has a positive impact on the environment, with regard to the reduction or even elimination of unnecessary consumption of network and energy resources in local and wide area networks.

Figure 3:
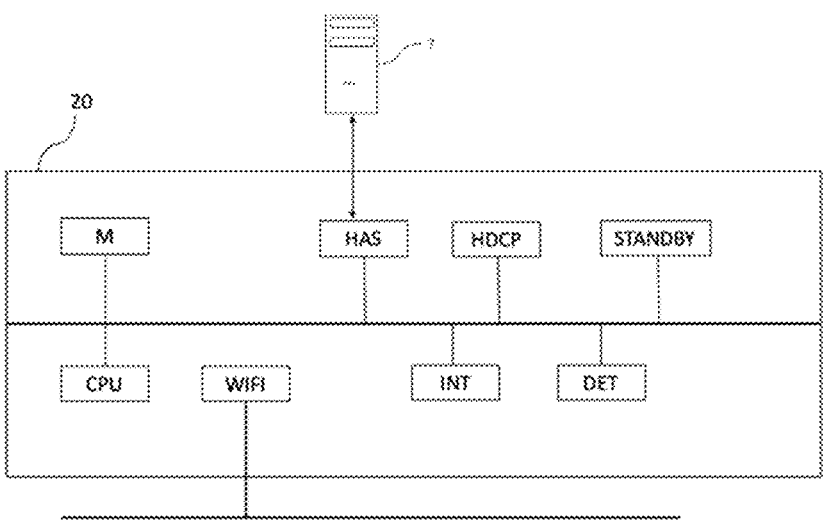
FIG. 3 schematically shows the hardware structure of a multimedia stream reader terminal integrating a standby management device capable of implementing the method of FIG. 2.

FIG. 3 shows an architecture of a multimedia stream reader terminal 20 according to one aspect of the disclosure. Thus, it illustrates only one particular way, among several possible ways, of producing this terminal, so that it carries out the steps of the method detailed above, in relation to FIG. 2. Indeed, these steps can be carried out indifferently on a reprogrammable calculation machine (a PC computer, a DSP processor or a microcontroller) executing a program comprising a sequence of instructions, or on a dedicated calculation machine (for example a set of logic gates like an FPGA or an ASIC, or any other hardware module).

This terminal 20, which can for example be an HDMI key or a TV decoder, conventionally comprises memories M associated with a CPU processor. The memories can be of the ROM ("Read Only Memory") or RAM ("Random Access Memory") or else Flash type. This terminal communicates with the local area network 10 and the wide area Internet network 1 via a WIFI module for local area wireless communication with the residential gateway 6 or another communication terminal of the local area network 10, for example the smartphone 3. It comprises in addition a content download module, for example an adaptive progressive download HAS module capable of requesting a progressive download of content.

The terminal 20 also integrates a module INT for managing the interface with the television 5, through which it obtains, for example, information on possible interactions of the user with the television 5 (action on the television remote control for example by pressing on the volume key or a channel change key), and by which it can control the display on the screen of the television 5 of pop-up windows, allowing it to deliver messages or alerts to the user.

For this specific embodiment, it also includes an HDCP module for negotiating a content protection session (HDCP session) between itself and the television 5, a session essential for the transmission to the television of the multimedia stream comprising content protected by copyright. This module allows control of access to multimedia content. However, it is not required for all aspects of the disclosure, and is in particular not essential in the case where the multimedia content to be transmitted is not protected by copyright.

The terminal 20 also comprises a DET module for detecting a state of the link which connects it to the television 5, generally at an HDMI link, which is for example an HDMI cable. In the specific case of the method according to the embodiment described in FIG. 2, this module is capable of detecting the state of the HDCP session established between the terminal 20 and the television 5.

The terminal 20 also comprises a standby module STANDBY, placing the terminal into standby when the detection module presented above detects that the state of the HDCP session established between the terminal and the television 5 is in an inactive state. This could be, for example, the case where the television is placed on standby automatically following a period of inactivity, or the case where the user interacted with their television to change the source, or to turn it off.

The terminal 20 according to an aspect of the disclosure can also contain other modules such as a hard drive not shown for storing video fragments, a module for processing commands received from a tablet or a smartphone on which is installed the application for controlling the terminal, thanks to which the user can control its operation, etc.

It will be noted that the term module can correspond as well to a software component as to a hardware component or a set of hardware and software components, a software component itself corresponding to one or more computer programs or subprograms more generally to any element of a program capable of implementing a function or a set of functions as described for the concerned modules. In the same way, a hardware component corresponds to any element of a hardware assembly capable of implementing a function or a set of functions for the concerned module (integrated circuit, smart card, memory card, etc.).

More generally, such a terminal 20 comprises a random access memory (for example a RAM memory), a processing unit equipped for example with a CPU processor, and controlled by a computer program, stored in a read only memory (for example a ROM memory or hard disk). At initialization, the code instructions of the computer program are for example loaded into the RAM before being executed by the CPU processor of the processing unit. The processor of the processing unit controls the detection of the state of the link which connects the terminal 20 to the television 5, and in particular the state of an HDCP session negotiated between these two terminals, the evaluation of the presence or the absence of user interactions with the terminal 20 or the television 5, the display of pop-up windows on the screen of the television 5, and the placement of the terminal 20 on standby, in particular when it has been detected that the state of its link with the television 5 corresponded to an inactive state and that subsequently, no user interaction was detected following the display of a pop-up window on the television 5.

Although the present disclosure has been described with reference to one or more examples, workers skilled in the art will recognize that changes may be made in form and detail without departing from the scope of the disclosure and/or the appended claims.

What is claimed is:

1. A method for managing standby of a multimedia stream reader terminal, which is associated with a multimedia content restitution terminal via a communication link, wherein the method is implemented by a standby management device associated with said multimedia stream reader terminal and comprises:

detecting a state of a link between said multimedia stream reader terminal and said restitution terminal on said communication link, said detecting comprising requesting at least two successive interrogations of the state of said link by said multimedia stream reader terminal; and placing said multimedia stream reader terminal on standby in the event of detection of an inactive state of said link, the inactive state of said link being detected when said link is considered inactive in response to said at least two successive interrogations by said multimedia stream reader terminal.

2. The method according to claim 1, wherein said link is a multimedia content protection session negotiated between said multimedia stream reader terminal and said restitution terminal.

3. The method according to claim 1, wherein the detection of said inactive state of the link is accompanied by a request for restitution of an alert message.

4. The method according to claim 3, wherein, in absence of a response to the alert message within a given time range, said multimedia stream reader terminal goes into standby mode.

5. A standby management device for managing standby of a multimedia stream reader terminal, which is associated with a multimedia content restitution terminal via a communication link, wherein the standby management device is associated with said multimedia stream reader terminal and comprises:

at least one processor; and at least one computer readable medium comprising instructions stored thereon which when executed by the at least one processor configure the device to:

detect a state of a link between said multimedia stream reader terminal and said restitution terminal on said communication link, said detection comprising requesting at least two successive interrogations of the state of said link by said multimedia stream reader terminal; and place said multimedia stream reader terminal on standby in the event of detection of an inactive state of said link, the inactive state of said link being detected when said link is considered inactive in response to said at least two successive interrogations by said multimedia stream reader terminal.

6. The device of claim 5, wherein the standby management device is implemented in the multimedia stream reader terminal.

7. A non-transitory computer readable data medium on which at least one series of program code instructions is stored which when executed by a processor of a standby management device configure the standby management device to perform a method of managing standby of a multimedia stream reader terminal, which is associated with a multimedia content restitution terminal via a communication link, wherein the method comprises:

detecting a state of a link between said multimedia stream reader terminal and said restitution terminal on said communication link, said detecting comprising requesting at least two successive interrogations of the state of said link by said multimedia stream reader terminal; and placing said multimedia stream reader terminal on standby in the event of detection of an inactive state of said link, the inactive state of said link being detected when said link is considered inactive in response to said at least two successive interrogations by said multimedia stream reader terminal.

* * * * *